Aug. 6, 1940.    R. O. HULBERT    2,210,585
CREEPER
Filed April 8, 1940
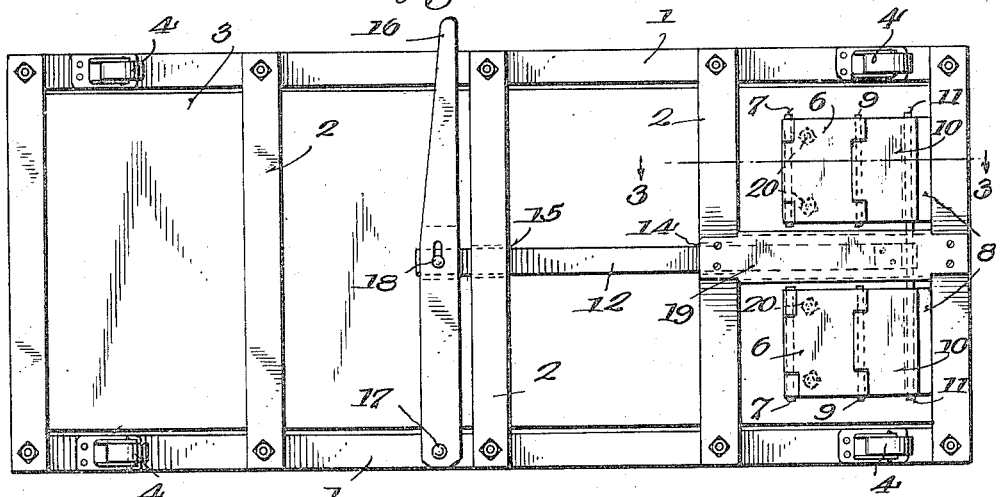
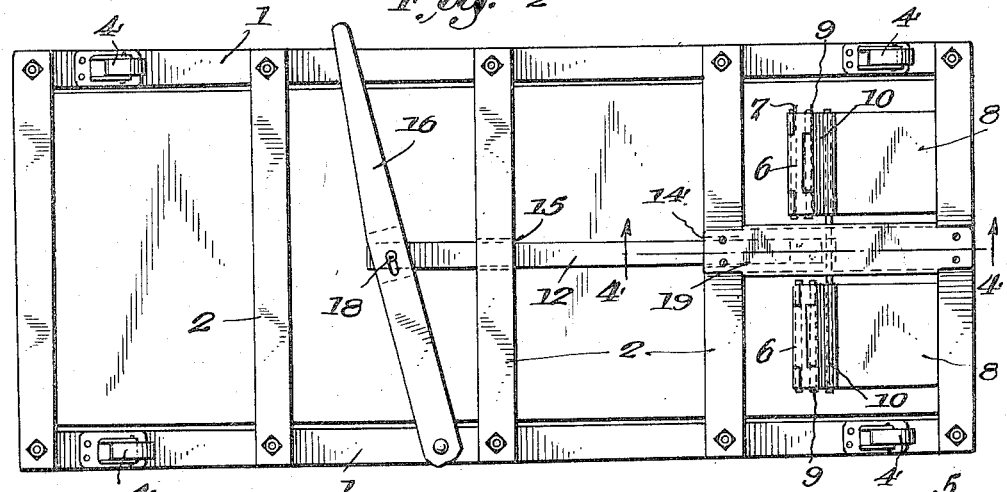
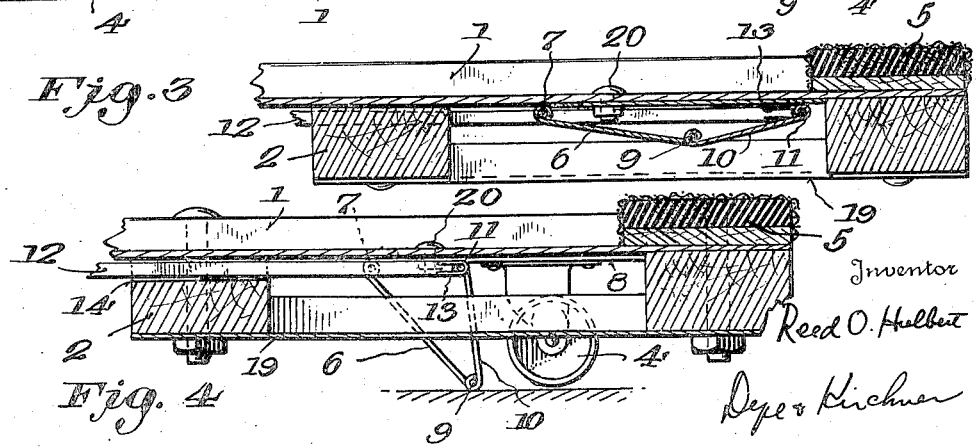
Inventor
Reed O. Hulbert
Dyer & Kirchner
Attorneys Patented Aug. 6, 1940

2,210,585

UNITED STATES PATENT OFFICE 2,210,585

CREEPER

Reed O. Hulbert, Ashtabula, Ohio

Application April 8, 1940, Serial No. 328,590

20 Claims. (Cl. 280—61.5)

My invention relates to mechanics' creepers, and more particularly to a creeper provided with a brake, and to a braking device per se adapted for use on creepers.

Creepers are low-lying platforms provided with casters or the like and used by repairmen to propel themselves to points under automobiles and the like and to support them slightly above the ground or floor under the automobile or the like during servicing, repairing, etc.

Heretofore difficulty has been experienced in fixing creepers against movement while in use beneath the vehicle or other object on which work is to be done, particularly under the stress of pushing and pulling movements applied to the work by wrenches and other tools used by the operator. Attempts have heretofore been made to provide creepers with a brake device for resisting such undesired movements, but difficulty has been experienced in providing an efficient, easily operated, inexpensive, durable and foolproof brake. So far as I am aware, prior to the present invention no creeper brake has been commercially successful.

Objects of the present invention are to provide a brake device composed of simple parts which are readily and inexpensively assembled and applied to a creeper of known construction, which will effectively hold the creeper against undesired movement and which can be moved to braking and released positions with a minimum of effort on the part of the operator, which will be durable throughout a long life and which will withstand rough treatment and abuse, including heavy loads incident to the creeper being run over by an automobile or the like, and which will be fool-proof and satisfactory in every respect.

In my United States Patent No. 2,084,957, issued June 22, 1937, I disclose a creeper construction of the general type to which the present brake device is adapted to be applied. An important feature of the present invention is its capacity to be installed on my patented creeper with a minimum of change in the original construction. Thus it is possible to employ the same creeper parts in the present braked creeper as in the original unbraked device, addition of the brake device involving only the mortising of one or two structural elements of the original creeper.

Although the foregoing feature is deemed to be one of significant advantage, it will be understood that the present invention is not regarded by me as limited to a structure necessarily including creeper parts of the type shown in my above identified patent. On the contrary, the present braked creeper may, in certain aspects of the invention, include creeper parts of substantially any known type. Furthermore, the present invention also contemplates a brake structure per se, which is adapted to be sold as a unit for installation on creepers of various types.

Referring now to the drawing, which forms part of this application for Letters Patent and which shows an operative embodiment of the invention which has been found eminently satisfactory in use, Figure 1 is a bottom plan view of a creeper including a brake device constructed in accordance with the principles of the present invention, the brake device being shown in retracted position;

Figure 2 is a similar view showing the brake device moved toward applied position;

Figure 3 is a detail vertical section taken along the line 3—3 of Figure 1; and

Figure 4 is a detail vertical section taken along the line 4—4 of Figure 2, but showing the brake device in fully applied position.

Figs. 3 and 4 show the creeper in fragmentary view, in upright or operative position.

As in the case of my patented construction the creeper selected to illustrate the present invention comprises a platform supported on casters arranged to present a minimum over-all height in order to provide maximum clearance beneath low structures. The platform comprises preferably a pair of longitudinal side rails 1 which are spaced apart and secured together by a plurality of cross members 2. Preferably five such cross members are employed, and they are securely bolted at spaced intervals to the under surfaces of the rails 1 to form an oblong frame. The rails and cross members are preferably made of hardwood of appropriate dimensions, and the intermediate portions of the several cross members bear and support a body board 3, which is best made of thin but stout plywood. Casters 4 are mounted on the under surfaces of the side rails 1 at each corner area of the frame, and a headrest 5 is provided across one end of the creeper, preferably directly above the head end cross member.

It will be understood that the several parts heretofore identified are bolted or otherwise secured together and that they constitute a creeper construction of the general type shown in my above identified patent.

The brake device contemplated by the present invention comprises a brake element which is hinged with relation to a part of the platform so that it can be normally maintained in retracted position above the plane of the ground or floor and can be projected at the will of an operator into engagement with the ground or floor. This brake element preferably takes the form of a plate 6 pivoted to a hinge pin 7 which is mounted on the under side of the creeper body board. A convenient mounting arrangement for the pin 7 includes a wear plate 8 bolted to the body board between the head end and the next adjacent cross members at one side of the longitudinal center line of the creeper. Complementary tongues formed on the wear plate and the braking element embrace the pin 7 in the common manner of hinge plates. In this way a fixed pivot for the element 6 is provided.

The free end of the plate 6 is connected by a pin 9 to a member 10 which may be a generally similar but shorter plate. Plates 6 and 10 may be connected to the pin 9 by complementally formed tongue portions, so that the plates 6 and 10 are hinged together much like the plates 6 and 8.

The free end of the plate 10 is curled about a pin 11 whose length is more than twice the width of the plate 10 so that the pin 11 extends a considerable distance from one side of the plate 10 to be engaged by a similar plate 10 of an identical set of brake parts 6, 7, 8, 9 and 10 which occupy the space between the head end and next adjacent cross members 2 on the opposite side of the longitudinal center line of the creeper. The two sets of brake parts are suitably spaced apart and this space is bridged by the intermediate portion of the pin 11.

Connected to the intermediate portion of the pin 11 is one end of a brake operating link 12. The connection may be effected in any suitable way, but I prefer to loop a metal strap 13 around the intermediate portion of the pin 11 and fasten the end portions of the strap to the link 12 by screws or bolts. The link 12 is preferably made of hardwood, although spring steel might be used. The link extends rearwardly of the creeper, along substantially its longitudinal center line, through a mortise 14 in the intermediate cross member 2 which is nearest the brake device, and preferably also through an aligned similar mortise 15 in the next adjacent intermediate cross bar 2. These mortises are formed in the upper surfaces of the cross members and are shallow in relation to the thickness of the cross members, being just deep enough to accommodate the comparatively thin link 12 for free longitudinal reciprocation. The free end of the link 12 is pin-connected to an operating handle 16 which is a lever fulcrumed at 17 beneath one of the side rails of the creeper at a point close to an intermediate cross member, preferably the center one of the preferred five cross members. The free end of the handle 16 projects slightly beyond the opposite cross member. The pin 18 which connects the handle to the link is preferably located therefore at substantially the mid-point of the handle.

A cover plate 19 of sheet metal may be bridged between the head end and next adjacent cross members and have its longitudinal edges slightly turned up in channel form to stiffen the plate and protect the connection between the link 12 and the pin 11.

The parts are proportioned so that the throw permitted the handle 16 between the two cross members 2 adjacent thereto will reciprocate the link 12 in its mortises sufficiently to move the brake element 6 from retracted position, shown in Figs. 1 and 3, in which the element is suspended well above the plane of the ground or floor, to a projected or applied position shown in Figs. 2 and 4, in which the free end of the brake element engages the ground or floor to resist movement of the creeper platform on its casters. It will be evident from the drawing illustrations and the foregoing explanation that reciprocation of the link 12 by movement of the handle 16 will move the pin 11 backward or forward of the creeper to slide the upper or outer end of each member 10 along its wear plate 8 so as to swing each of the brake elements 6 between the positions best shown in Figs. 3 and 4. In a preferred embodiment the plate 10 is made as long as, or slightly longer than, the vertical distance between the wear plate 8 and the bottom of the caster 4, and the plate 6 is made somewhat longer, as best shown in Fig. 4, so that when the brake is fully applied the plate 10 will be substantially vertical or will have moved slightly beyond dead center, the pair of casters at the brake end of the creeper being in either case slightly lifted from, or exerting appreciable thrust against, the ground or floor. In the preferred form of construction, in which the shorter plate moves beyond dead center, the brake is held applied by the weight of the creeper and its load, as will be evident. In the other form of construction, in which the shorter plate is substantially vertical when the plate 6 is in braking position, the weight of the creeper and its load has no tendency to release the brake, as will also be understood.

It will be obvious that the brake device, including its actuating means, is well protected against destruction or injury should the creeper be accidentally run over by a heavy vehicle or the like. With the platform and the link and handle made of hardwood, spring steel, or equivalent resilient material, a heavy load imposed on any part of the platform will temporarily bend the parts until one or more of the cross members comes into contact with the ground or floor. The resilience of the parts promptly restores them to normal condition when the load is removed.

The shallow mortises which constitute the only change required in the parts of the creeper disclosed in my above identified patent do not weaken the platform since the cross members have inherently greater strength than is required to support any normal load, and since the mortises facilitate the flexing of the cross members under abnormal loads.

It will be observed that in the preferred embodiment each brake element 6 makes line contact with the ground or floor and that the aggregate contact of the two elements is a line of considerable length. This is a feature of importance because it effectively prevents pivotal movement of the braked creeper in reaction to pushing and pulling forces exerted by the workman.

If, as is preferred, the wear plates are secured to the body board by bolts such as shown at 20, these bolts may be located so as to serve also as stops for limiting movement of the two brake plates in projected direction.

While of course the brake device and its actuating handle may be disposed along any parts of the under surface of the platform, I prefer to mount these parts in their respective locations as shown in the drawing, since I have found that these locations make for maximum convenience in use.

Various changes may be made in the structure selected to illustrate the invention, but all such changes, insofar as they embody the principles of the invention as explained herein and as pointed out by the appended claims, are to be regarded as within the scope of the invention and as covered by the claims.

I claim:

1. A creeper comprising a platform supported on casters and having a brake including a pair of brake elements hinged together at one end of each, hinge means mounting the opposite end of one of the elements on the under side of the platform, and means moving the opposite end of the other element toward and away from said hinge means to project and retract the first named ends of the elements into and out of braking engagement with the ground or floor.

2. A creeper comprising a platform supported on casters, a brake element having one end hinged to the creeper whereby its other end is adapted to swing below the under surface thereof into and out of braking engagement with the ground or floor, a rigid link having one end hinged to a part of the brake element spaced from the hinged end thereof and having its other end mounted for sliding movement along the creeper, and means connected with said other end of the rigid link for sliding the same to project and retract the brake element.

3. A creeper comprising a platform supported on casters, a brake plate hingedly mounted on the creeper to swing below the same into braking engagement with the ground or floor, means for operating the plate comprising a stiff member having one end hingedly connected to a part of the plate spaced from the hinge thereof and having its other end mounted on the creeper for sliding movement therealong, and means including a lever for effecting said sliding movement.

4. A creeper comprising a platform supported on casters and having a brake comprising a pair of plates hinged together at one end of each, means hingedly mounting the other end of one of the plates on the under side of the creeper, means mounting the other end of the other plate for sliding movement along the creeper toward and from said hinged mounting means to project and retract the two plates together into and out of braking engagement with the ground or floor, and actuating means for applying force to the second plate to move the same.

5. A creeper comprising a platform supported on casters and having a brake comprising a pair of plates hinged together at one end of each and having their other ends mounted on the under side of the creeper, in combination with means for moving said other ends toward and away from each other to project and retract the hinged-together ends into and out of braking engagement with the ground or floor.

6. A creeper comprising a platform supported on casters and having a brake comprising a pair of plates hinged together at one end of each, means mounting the other ends of the plates on the under side of the creeper, and a rigid link connected to said other end of one of the plates and mounted for movement along the creeper for sliding said other end along the creeper toward and away from said other end of the other plate to project and retract the hinged-together ends of the plates into and out of braking engagement with the ground or floor.

7. A creeper comprising a platform supported on casters and having a brake comprising a pair of plates hinged together at one end of each, means mounting the other ends of the plates on the under side of the creeper, a rigid link connected to said other end of one of the plates and mounted for movement along the creeper for sliding said other end along the creeper toward and away from said other end of the other plate to project and retract the hinged-together ends of the plates into and out of braking engagement with the ground or floor, and a lever extending generally transversely of the creeper and connected to said link for actuating the same.

8. A creeper comprising a platform supported on casters and having a brake comprising a pair of plates hinged together at one end of each, a hinge pin mounted in fixed pivot relation to the under side of the creeper and pivotally mounting the other end of one of the plates, an eye formed on the other end of the other plate, means mounting said other end for sliding movement along the creeper toward and away from said hinge pin, a rigid link connected to said eye, and a lever extending generally transversely of the creeper and connected to said link for actuating the same to project and retract the hinged-together ends of the plates into and out of braking engagement with the ground or floor.

9. A creeper comprising a frame including plural spaced cross members, casters mounting the creeper, a brake including an element mounted on the under side of the creeper, means for projecting said element into braking engagement with the ground or floor and for retracting the same therefrom comprising a member hinged at one end to the brake element and having its other end mounted for sliding movement along the creeper between two of the cross members, a link connected with said other end extending along the creeper close to the under surface thereof and penetrating a cross member through an opening therein, and means connected to the free end of the link and operable to reciprocate the link to project and retract the brake element.

10. A creeper comprising a frame including plural spaced cross members, casters mounting the creeper, braking means mounted on the under side of the creeper in the space between two of the cross members, an axially reciprocable link penetrating said space through an opening in one of said two cross members and extending into another space between two cross members, means connecting one end of the link with the braking means, and a lever connected to the other end of the link and operable to reciprocate the link for actuating the braking means.

11. A creeper comprising a body board, plural spaced cross members supporting the body board, casters mounting the creeper, a brake device mounted adjacent the under surface of the body board in the space between two of the cross members, an axially reciprocable link penetrating said space through an opening in one of said two cross members and extending adjacent the body board into another space between two cross members, means connecting one end of the link with the brake device, and a lever connected to the other end of the link and operable to reciprocate the link for actuating the brake device.

12. A creeper comprising longitudinal side rails, plural spaced cross members connecting the rails and secured to the under side thereof, a body board mounted on the cross members between the rails, casters mounting the creeper, a brake device mounted adjacent the under surface of the body board in the space between two of the cross members and including an element slidable along the body board for projecting and retracting a braking member, an axially reciprocable link penetrating said space through an opening in one of said two cross members and extending adjacent the body board into another space between two cross members, means connecting one end of the link with the slidable element, and a lever connected to the other end of the link and extending from said second named space beyond one of the side rails for actuation to reciprocate the link and operate the braking member.

13. A creeper comprising longitudinal side rails, plural spaced cross members connecting the rails and secured to the under side thereof, a body board mounted on the cross members between the rails, casters mounting the creeper, a brake device mounted adjacent the under surface of the body board in the space between two of the cross members and including an element slidable along the body board for projecting and retracting a braking member, an axially reciprocable link penetrating said space through an opening in one of said two cross members and extending adjacent the body board into another space between two cross members, means connecting one end of the link with the slidable element, a lever fulcrumed on a side rail opposite said second named space and having its other end extending beyond the other side roll, and means connecting an intermediate point on the lever with the other end of the link, whereby swinging of the lever reciprocates the link to operate the brake device.

14. A creeper comprising longitudinal side rails, plural spaced cross members connecting the rails and secured to the under side thereof including a center cross member substantially coincident with the transverse center line of the creeper, casters mounting the creeper, a body board mounted on the cross members between the side rails, a brake device comprising a plate hinged to a fixed pivot mounted on the under side of the body board near one end of the creeper, a plate having one end hinged to the free end of the first plate and having its other end slidable along the body board, an operating link reciprocable through mortises in certain of the cross members including said center cross member, means connecting one end of said link with the second named plate, a lever fulcrumed to one of the side rails and projecting transversely of the creeper beyond the other side rail, and means connecting an intermediate part of said lever to the opposite end of said link, whereby movement of the lever about its fulcrum reciprocates the link to project and retract said plates into and out of braking engagement with the ground or floor.

15. A brake device for a creeper comprising a wear plate secured to an under surface of the creeper, a brake hinged to one end of the wear plate, and an operating plate hinged to the brake plate, in combination with means connected to the free end of the operating plate to slide the same along the wear plate to project and retract the brake plate into and out of braking engagement with the ground or floor.

16. A brake device for a creeper comprising a pair of spaced wear plates each secured to an under surface of the creeper, a brake plate hinged to one end of each of the wear plates, and an operating plate hinged to each of the brake plates, in combination with an element connecting the free ends of the spaced operating plates, and a link connected to said element between said operating plates for sliding the operating plates together along the respective wear plates to project and retract the brake plate into and out of braking engagement with the ground or floor.

17. A brake device for a creeper comprising a pair of plates hinged in aligned spaced relation to pivot means fixed on the creeper so as to adapt the plates to swing below the creeper, a stiff link mounted in the space between the plates for reciprocation, and means connecting the plates and the link whereby pushing and pulling forces applied to the link are transmitted substantially equally to the plates to project and retract the plates into and out of braking engagement with the ground or floor.

18. A creeper comprising a platform supported on casters, a brake plate hingedly mounted on the creeper to swing below the same into oblique angular braking engagement with the ground or floor, and means for operating the plate comprising a stiff member having one end hinged to the lower end of the brake plate and having its other end slidable along the under surface of part of the creeper and substantially as long as the vertical distance between said part and the bottom of said casters, whereby said member is substantially vertical when the brake is in braking engagement with the ground or floor.

19. A creeper comprising a platform supported on casters, a brake plate hingedly mounted on the creeper to swing below the same into oblique angular braking engagement with the ground or floor, and means for operating the plate comprising a stiff member having one end hinged to the lower end of the brake plate and having its other end slidable along the under surface of part of the creeper and slightly longer than the vertical distance between said part and the bottom of said casters, whereby said member moves slightly beyond dead center when the brake plate is moved into braking engagement with the ground or floor.

20. A creeper comprising a platform supported on casters, a brake plate hingedly mounted on the creeper to swing below the same into oblique angular braking engagement with the ground or floor, and means for operating the plate comprising a stiff compression member having one end hinged to the brake plate and having its other end slidable along the under surface of part of the creeper to a position beyond a dead center point to move the brake plate into braking engagement with the ground or floor.

REED O. HULBERT.